3,322,853
POLYBLENDS CONTAINING A GRAFT COPOLYMER OF HYDROXYLATED DIENE RUBBER, A COPOLYMER CONTAINING A POLYBASIC ETHYLENICALLY UNSATURATED CARBOXYLIC ACID WITH ANOTHER VINYLIDENE MONOMER, AND A POLYEPOXIDE
Quirino A. Trementozzi, Springfield, Mass., Stanley E. Gebura, Overland Park, Kans., and Frederic J. Locke, East Longmeadow, Mass., assignors to Monsanto Company, St. Louis, Mo., a corporation of Delaware
No Drawing. Filed June 19, 1964, Ser. No. 376,589
14 Claims. (Cl. 260—837)

This invention relates to polyblends and more particularly to polyblends of (a) acid interpolymers, (b) graft copolymers comprising a diene rubber substrate polymer and a hydroxylic superstrate polymer and (c) epoxy resins.

An object of this invention is to provide novel polyblends.

Another object is the provision of a novel class of polyblends of acid interpolymers with graft copolymers containing hydroxyl groups and epoxy resins.

A further object is the provision of methods for preparing such polyblends.

These and other objects are attained through the provision of blends comprising:

(A) a graft copolymer comprising a diene rubber substrate polymer and a hydroxylic superstrate polymer in proportion of about 15 to 200 parts by weight of superstrate polymer per 100 parts by weight of substrate polymer, (B) an acid interpolymer comprising an acid monomer as hereinafter set forth interpolymerized with at least one vinylidene monomer interpolymerizable therewith, said acid interpolymer having a Parr-Bar softening point of less than about 225° C. and an intrinsic viscosity of less than about 0.5 as determined in pyridine at 30° C., and (C) an epoxy compound containing a plurality of epoxy groups.

The following examples are presented in illustration of the invention and are not intended as limitations thereon. Where parts are mentioned, they are parts by weight unless otherwise specified.

EXAMPLE I (Preparation of graft copolymer latices)

Part A

Prepare a series of Diene Rubber Substrate Polymer Latices, A–Q, according to the following polymerization recipe:

| Component: | Parts |
|---|---|
| Water | 250 |
| Diene | X |
| Comonomer(s) | Y |
| Divinylbenzene | 0.5 |
| Sodium stearate | 5 |
| Potassium persulfate | 0.3 |
| t-Dodecyl mercaptan | 0.4 |

Charge the water and soap to a suitable reaction vessel, deoxygenate the soap solution by boiling, cool under nitrogen, add the remaining components of the recipe, and heat with agitation at 50° C. to about 95% conversion of monomers to polymer. The nature and amount of the diene rubber and the comonomer(s) in each instance are shown in Table A, infra.

Part B

Prepare a series of graft copolymer latices, A–Q, by adding varying amounts of ethylenically unsaturated alcohol and optional comonomer(s), together with 0.2 part of t-dodecyl mercaptan, to aliquots of Diene Rubber Substrate Polymer Latices, A–Q, prepared in Part A hereof, containing 100 parts of rubber solids and heating the reaction mixture at 70° C. with agitation until substantially all of the monomer mixture has polymerized. Stabilize each of the latices by adding 2 parts of a styrenated phenol antioxidant thereto. The nature and amount of the ethylenically unsaturated alcohol and the comonomer(s) in each instance are shown in Table A, infra. The graft copolymers in each instance are comprised of a diene/optional comonomer substrate with an ethylenically unsaturated alcohol/optional comonomer superstrate grafted thereto in the designated proportions.

Part C

Each of the graft copolymer latices, A–Q, are precipitated in an excess of methanol and the solids are recovered by filtration. The solids are then dispersed in a proportion of methyl ethyl ketone calculated to provide approximately 15% solids by weight dispersions.

TABLE A.—HYDROXYLATED GRAFT COPOLYMERS

| Graft Copolymer Latex | A-Diene Rubber Substrate Polymer | | | | B-Hydroxylic Superstrate Polymer | | | | Parts B per 100 Parts A |
|---|---|---|---|---|---|---|---|---|---|
| | Diene | Parts X | Comonomer(s) | Parts Y | Ethylenically Unsaturated Alcohol | Parts | Comonomer(s) | Parts | |
| I-A | Butadiene | 100 | None | | Vinylbenzyl alcohol | 10 | Styrene/Acrylonitrile | 80/10 | 60 |
| I-B | ---do--- | 90 | Styrene | 10 | ---do--- | 10 | ---do--- | 80/10 | 60 |
| I-C | ---do--- | 90 | ---do--- | 10 | ---do--- | 10 | ---do--- | 70/20 | 60 |
| I-D | ---do--- | 90 | ---do--- | 10 | Phenylallyl alcohol | 10 | ---do--- | 70/20 | 60 |
| I-E | ---do--- | 90 | ---do--- | 10 | ---do--- | 20 | ---do--- | 60/20 | 60 |
| I-F | ---do--- | 75 | Styrene/Vinylbenzyl alcohol | 10/15 | Vinylbenzyl alcohol | 10 | ---do--- | 70/20 | 60 |
| I-G | ---do--- | 75 | Styrene/Phenylallyl alcohol | 10/15 | Phenylallyl alcohol | 10 | ---do--- | 70/20 | 60 |
| I-H | ---do--- | 80 | Phenylallyl alcohol | 20 | ---do--- | 10 | ---do--- | 70/20 | 50 |
| I-I | ---do--- | 90 | Styrene | 10 | Vinylbenzyl alcohol | 20 | Styrene | 80 | 60 |
| I-J | ---do--- | 100 | None | | Phenylallyl alcohol | 100 | ---do--- | | 35 |
| I-K | Isoprene | 75 | Styrene | 25 | 2-hydroxymethyl butadiene | 100 | ---do--- | | 90 |
| I-L | Butadiene | 90 | ---do--- | 10 | Ethyl betahydroxyethyl fumarate | 20 | Vinyl chloride | 80 | 50 |
| I-M | ---do--- | 90 | ---do--- | 10 | Bis-(betahydroxyethyl)fumarate | 25 | Methyl methacrylate | 75 | 30 |
| I-N | ---do--- | 90 | ---do--- | 10 | Betahydroxyethyl acrylate | 10 | Ethyl acrylate | 90 | 60 |
| I-O | ---do--- | 90 | ---do--- | 10 | Ethyl betahydroxyethyl fumarate | 77 | Butene-1 | 23 | 30 |
| I-P | ---do--- | 90 | ---do--- | 10 | Phenylallyl alcohol | 25 | Butadiene | 75 | 40 |
| I-Q | ---do--- | 80 | Styrene/Vinylbenzyl alcohol | 10/10 | Vinylbenzyl alcohol | 25 | ---do--- | 75 | 50 |

EXAMPLE II

Part A (Preparation of a styrene/maleic anhydride interpolymer)

A monomer solution consisting of 80 parts of styrene, 20 parts of maleic anhydride, 1.5 parts of ditertiarybutyl peroxide and 1 part dodecyl mercaptan is prepared. 100 parts of diethyl benzene are charged to a sealed, stirred autoclave and heated to 175° C. The monomer mixture is then added to the autoclave at a constant rate over a period of 2.5 hours while maintaining the reaction mixture at a temperature of 175° C. The diethyl benzene solvent is then removed from the polymer mixture by vacuum distillation from the autoclave. The molten polymer is removed from the autoclave and placed in a shallow cooling pan. The polymer has a softening point, as determined by the Parr-Bar method, of 125° C. and an intrinsic viscosity of 0.055 as determined in pyridine at 30° C.

Part B (Preparation of other acid interpolymers)

A series of additional acid interpolymers are prepared following the general procedure described in Part A of this Example II. The composition of the monomer charge, the reaction solvent, the reaction time (i.e., the period over which the monomer charge is added to the reaction solvent), the reaction temperature, the softening point of the acid interpolymer, and the intrinsic viscosity of the acid interpolymer as determined in pyridine at 30° C. are set forth in Table B, infra.

TABLE B.—ACID INTERPOLYMERS

| Example | Monomer Charge | | | Reaction Solvent | | Conditions | | Parr-Bar Softening Point, °C. | Intrinsic Viscosity |
|---|---|---|---|---|---|---|---|---|---|
| | Component | Parts | Mol, percent | Solvent | Parts | Temp., °C. | Hours | | |
| II-A | Styrene | 80 | 79 | Diethyl Benzene | 100 | 175 | 2.5 | 125 | 0.15 |
| | Maleic Anhydride | 20 | 21 | | | | | | |
| II-B (1) | Styrene | 100 | 64 | Cyclohexanone | 230 | 145 | 3.0 | 205 | 0.21 |
| | Maleic Anhydride | 54 | 36 | | | | | | |
| II-B (2) | Styrene | 126 | 62 | ___do___ | 200 | 145 | 2.0 | 147 | 0.15 |
| | Ethyl Acrylate | 27 | 14 | | | | | | |
| | Maleic Anhydride | 47 | 24 | | | | | | |
| II-B (3) | Styrene | 108 | 50 | Acetophenone | 300 | 145 | 3.5 | 155 | 0.15 |
| | 2-Ethyl Acrylate | 92 | 25 | | | | | | |
| | Maleic Anhydride | 49 | 25 | | | | | | |
| II-B (4) | Styrene | 110 | 46 | Cyclohexanone | 50 | 145 | 3.0 | | |
| | Acrylonitrile | 40 | 32 | Diethyl Benzene | 150 | | | | |
| | Maleic Anhydride | 50 | 22 | | | | | | |
| II-B (5) | Methyl Methacrylate | 140 | 70 | Methyl Ethyl Ketone | 200 | 175 | 2.5 | | |
| | Maleic Anhydride | 60 | 30 | | | | | | |
| II-B (6) | Styrene | 90 | 35 | ___do___ | 200 | 90 | 4.0 | | |
| | Butadiene | 60 | 44 | | | | | | |
| | Maleic Anhydride | 50 | 21 | | | | | | |

EXAMPLE III (Preparation of polyblends)

Part A

A series of acid interpolymer/epoxy compound mixtures are prepared by dissolving 100 parts of each of the acid interpolymers prepared in Example II and listed in Table B, supra, a variable proportion (shown in Table C, infra) of Epon 828 (essentially the diglycidyl ether of bis-phenol A), and 0.25 part of dodecyl trimethyl ammonium chloride in 85 parts of methyl ethyl ketone.

Part B

A series of polyblends are prepared by mixing 220 parts (ca. 100 parts of acid interpolymer solids) of the solution prepared in Part A of this Example III and a variable proportion (shown in Table C, infra) of the hydroxylated graft copolymer solution prepared in Part C of Example I. All compositions are shown in Table C, infra.

TABLE C

| Example | Hydroxylated Graft Copolymer | | | | | Acid Interpolymer | | | Epon 828 (Parts) |
|---|---|---|---|---|---|---|---|---|---|
| | Of Ex. | Parts | Substrate | | Superstrate | | Of Ex. | Parts | Composition | |
| | | | | Parts | | Parts | | | | |
| III-A | I-A | 8 | 100 Butadiene | 100 | 10 Vinylbenzyl Alcohol<br>80 Styrene<br>10 Acrylonitrile | 60 | II-A | 100 | 80 Styrene, 20 Maleic Anhydride | 36 |
| III-B | I-B | 8 | 90 Butadiene<br>10 Styrene | 100 | ___do___ | 60 | II-A | 100 | ___do___ | 36 |
| III-C | I-C | 8 | ___do___ | 100 | 10 Vinylbenzyl Alcohol<br>70 Styrene<br>20 Acrylonitrile | 60 | II-A | 100 | ___do___ | 36 |
| III-D | I-C | 4 | ___do___ | 100 | ___do___ | 60 | II-A | 100 | ___do___ | 36 |
| III-E | I-D | 8 | ___do___ | 100 | 10 Phenylallyl Alcohol<br>70 Styrene<br>20 Acrylonitrile | 60 | II-A | 100 | ___do___ | 36 |
| III-F | I-E | 8 | ___do___ | 100 | 20 Phenylallyl Alcohol<br>60 Styrene<br>20 Acrylonitrile | 60 | II-A | 100 | ___do___ | 36 |
| III-G | I-E | 4 | ___do___ | 100 | ___do___ | 60 | II-A | 100 | ___do___ | 36 |
| III-H | I-F | 200 | 75 Butadiene<br>10 Styrene<br>15 Vinylbenzyl Alcohol | 100 | 10 Vinylbenzyl Alcohol<br>70 Styrene<br>20 Acrylonitrile | 60 | II-B(1) | 100 | 100 Styrene, 54 Maleic Anhydride | 60 |
| III-I | I-G | 50 | 75 Butadiene<br>10 Styrene<br>15 Phenylallyl Alcohol | 100 | 10 Phenylallyl Alcohol<br>70 Styrene<br>20 Acrylonitrile | 60 | II-A | 100 | 80 Styrene, 20 Maleic Anhydride | 36 |
| III-J | I-H | 25 | 80 Butadiene<br>20 Phenylallyl Alcohol | 100 | 10 Vinylbenzyl Alcohol<br>70 Styrene<br>10 Acrylonitrile | 50 | II-B (2) | 100 | 126 Styrene, 27 Ethyl Acrylate, 47 Maleic Anhydride | 42 |
| III-K | I-I | 100 | 90 Butadiene<br>10 Styrene | 100 | 20 Vinylbenzyl Alcohol<br>80 Styrene | 60 | II-B (4) | 100 | 110 Styrene, 40 Acrylonitrile, 50 Maleic Anhydride | 38 |
| III-L | I-J | 20 | 100 Butadiene | 100 | 100 Phenylallyl Alcohol | 35 | II-B (3) | 100 | 108 Styrene, 92 2-ethylhexyl acrylate, 49 Maleic Anhydride | 43 |

TABLE C—Continued

| Example | Hydroxylated Graft Copolymer | | | | Acid Interpolymer | | | Epon 828 (Parts) |
|---|---|---|---|---|---|---|---|---|
| | Of Ex. | Parts | Substrate | Superstrate | Of Ex. | Parts | Composition | |
| | | | | Parts ... Parts | | | | |
| III-M | I-K | 10 | 75 Isoprene ___ 100<br>25 Styrene | 190 2-Hydroxymethyl Butadiene ___ 90 | II-B (5) | 100 | 140 Methyl Methacrylate, 60 Maleic Anhydride. | 50 |
| III-N | I-L | 25 | 90 Butadiene ___ 100<br>10 Styrene | 20 Ethyl Betahydroxyethyl Fumarate ___ 50<br>80 Vinyl Chloride | II-B (6) | 100 | 90 Styrene, 60 Butadiene, 50 Maleic Anhydride. | 36 |
| III-O | I-M | 10 | ___do___ 100 | 25 Bis-(betahydroxyethyl) Fumarate ___ 30<br>75 Methyl Methacrylate | II-A | 100 | 80 Styrene, 20 Maleic Anhydride. | 118 |
| III-P | I-N | 10 | ___do___ 100 | 10 Betahydroxy ethyl acrylate ___ 60<br>90 Ethyl Acrylate | II-A | 100 | ___do___ | 4.5 |
| III-Q | I-O | 10 | ___do___ 100 | 77 Ethyl Betahydroxyethyl Fumarate ___ 30<br>23 Butene-1 | II-A | 100 | ___do___ | 54 |
| III-R | I-P | 10 | ___do___ 100 | 25 Phenylallyl Alcohol ___ 40<br>75 Butadiene | II-A | 100 | ___do___ | 18 |
| III-S | I-Q | 10 | 80 Butadiene ___ 100<br>10 Styrene<br>10 Vinylbenzyl Alcohol | 25 Vinylbenzyl Alcohol ___ 50<br>75 Butadiene | II-A | 100 | ___do___ | 9 |

EXAMPLE IV (Preparation of glass laminates)

The polyblends prepared in Examples III-B—III-G are fabricated into multi-ply laminates and tested for bond strength. All resinous polybends are adjusted to 62% solids by weight with methyl ethyl ketone. In each instance a glass cloth (Hess Goldsmith style 28 with a Volan A finish) measuring 10 inches by 38 inches is rolled into a cylinder and immersed in the resinous solution for 30 minutes. The cloth is removed and drawn between stainless steel rolls set for a 12 mil gap. The cloth is dried at 125° C. for 5 minutes in a forced hot air oven to drive off solvent. Each cloth is then cut into 3 inch diameter disks and assembled into an 80 ply laminate preform which is then pressed between chrome plated steel platens at 160° C. and 1000 p.s.i. for 1 hour and then cooled under pressure. Each laminate is cut into 3 specimens, each measuring 1 inch by 1 inch by 0.5 inch, and the bond strength is determined by the method described in ASTM D-229-58, paragraphs 40-43. Each polyblend is run in triplicate and the average bond strength reported. The results for the polyblends of Examples III-B—III-G as well as a control showing the bond strength using the acid interpolymer and epoxy compound alone, are shown in Table D, infra.

admixture with one or more copolymerizable ethylenically unsaturated monomers, one of which may be a nitrile monomer, in proportions of from about 1 to 100% by weight of the ethylenically unsaturated alcohol, from zero to about 60% by weight of the ethylenically unsaturated nitrile, and from zero to about 95% by weight of other copolymerizable ethylenically unsaturated monomers. The preferred hydroxylated graft copolymers are those prepared by polymerizing from about 20 to 90 parts, and particularly 40 to 80 parts, of superstrate monomer(s) per 100 parts of diene rubber polymer.

The graft copolymerization reaction is conducted with agitation at a temperature at which the initiator in the system initiates copolymerization of the superstrate monomer(s), usually a temperature of 40–100° C. Supplementary polymerization initiator may be added to the system to insure substantially complete conversion of the monomer charge to polymer, but this supplementary initiator is frequently unnecessary because of the ability of unconsumed initiator remaining from the preparation of the diene rubber polymer and/or active sites on the chain of the diene rubber polymer to initiate polymerization of the monomer charge.

The reaction is preferably conducted in the substantial absence of any emulsifying agent added to the preformed diene rubber polymer latex because of the effect of added

TABLE D

| Polyblend of Example | Hydroxylated Graft Copolymer | | | | Acid Interpolymer | | | Epon 828 Parts | Bond Strength, lbs. |
|---|---|---|---|---|---|---|---|---|---|
| | Of Ex. | Parts | Substrate | Superstrate | Of Ex. | Parts | Composition | | |
| | | | Parts | Parts | | | | | |
| Control | | | | | II-A | 100 | 80 Styrene, 20 Maleic Anhydride. | 36 | 630 |
| III-B | I-B | 8 | 90 Butadiene ___ 100<br>10 Styrene | 10 Vinylbenzyl Alcohol ___ 60<br>80 Styrene<br>10 Acrylonitrile | II-A | 100 | ___do___ | 36 | 1,300 |
| III-C | I-C | 8 | ___do___ 100 | 10 Vinylbenzyl Alcohol ___ 60<br>70 Styrene<br>20 Acrylonitrile | II-A | 100 | ___do___ | 36 | 1,430 |
| III-D | I-C | 4 | ___do___ 100 | ___do___ 60 | II-A | 100 | ___do___ | 36 | 1,235 |
| III-E | I-D | 8 | ___do___ 100 | 10 Phenylallyl Alcohol ___ 60<br>70 Styrene<br>20 Acrylonitrile | II-A | 100 | ___do___ | 36 | 1,540 |
| III-F | I-E | 8 | ___do___ 100 | 20 Phenylallyl Alcohol ___ 60<br>60 Styrene<br>20 Acrylonitrile | II-A | 100 | ___do___ | 36 | 1,315 |
| III-G | I-E | 4 | ___do___ 100 | ___do___ 60 | II-A | 100 | ___do___ | 36 | 1,240 |

HYDROXYLATED GRAFT COPOLYMERS

The hydroxylated graft copolymers of this invention are prepared by polymerizing from about 15 to 200 parts by weight of superstrate monomer in an aqueous dispersion containing 100 parts by weight of the diene rubber polymer which will form the substrate of the hydroxylated graft copolymer. The aforesaid superstrate monomer comprises an ethylenically unsaturated alcohol in optional emulsifying agent in decreasing grafting efficiency. The emulsifying agent already present in the diene rubber polymer latex is usually sufficient to act as a dispersing agent for the graft copolymerization reaction. If desired, however, up to about 2% of emulsifying agent, based on the weight of the superstrate monomer mixture, can be added to the aqueous dispersion. The observance of this precaution with regard to added emulsifying agent permits the attainment of high grafting efficiency. As a result, the graft copolymers generally have at least 80% of the superstrate chemically-combined with the substrate. Since no unreacted rubber can be extracted from the graft copolymer, it appears that all of the diene rubber polymer becomes chemically combined with the superstrate.

Optionally additives, such as chain transfer agents and stabilizers, can be included in the graft copolymerization reaction mixture when desired.

*Hydroxylated graft copolymer superstrate.*—The superstrate of the hydroxylated graft copolymer comprises (a) from about 1 to 100%, and preferably from about 5 to 25%, by weight of a chemically-combined ethylenically unsaturated alcohol, (b) from zero to about 60%, preferably from zero to about 30%, by weight of a chemically-combined ethylenically unsaturated nitrile and (c) from zero to about 95%, and preferably from about 40 to 90%, by weight of other chemically-combined copolymerizable ethylenically unsaturated monomer(s).

The ethylenically unsaturated alcohols suitable for use are ethylenically unsaturated mono- and poly-hydroxylic monomers. If desired, other functional groups than hydroxyl may be present in the monomer structure. Thus these alcohols may be selected from a wide class of materials including aromatic alcohols such as, e.g., vinyl benzyl alcohol, 2-phenyl allyl alcohol, vinyl betahydroxyethyl benzene, betahydroxyethyl styrene, etc; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethy butadiene-1,3,2,3 - bis-(hydroxymethyl)butadiene-1,3, etc.; hydroxylic mono- and poly-carboxylic acid esters such as, e.g., ethyl betahydroxyethyl fumarate, bis-(betahydroxyethyl) fumarate, betahydroxyethyl acrylate, butyl betahydroxypropyl fumarate, betahydroxypropyl methacrylate, betahydroxpropyl crotonate, bis-(betahydroxyethyl)itaconate, ethyl betahydroxyethyl maleate, alphahydroxymethyl methacrylate, etc., hydroxylic mono- and poly-carboxylic acids such as, e.g.; alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymaleimide, N-betahydroxypropyl maleimide, betahydroxyethyl acrylamide, 2-hydroxymethyl allyl amine, etc.; alphahydroxymethyl acrylonitrile; etc. Various of these alcohols are employed in the examples, but may be replaced, with equivalent results, with any of the other alcohols characterized above, or mixtures thereof.

Ethlenically unsaturated nitriles suitable for use are acrylonitrile, methacrylonitrile, and mixtures thereof.

The copolymerizable ethylenically unsaturated monomer(s) suitable for use are selected from a wide class of vinyl and vinylidene monomers including olefins such as, e.g., ethylene, propylene, isobutylene, 3-methyl butene-1, butene-1, pentene-1, etc., mono- and poly-carboxylic acid esters such as, e.g., methyl methacrylate, ethyl acrylate, diethyl maleate, etc.; mono- and poly-carboxylic acids or anhydrides such as, e.g., acrylic acid, methacrylic acid, crotonic acid, fumaric acid, maleic acid, maleic anhydride, itaconic acid, etc.; vinyl and vinylidene halides such as e.g., vinyl chloride, vinyl bromide, vinylidene chloride, etc. Particularly preferred are the monovinylidene aromatic compounds such as styrene; and substituted alkyl styrenes such as, e.g., ortho-, meta- and para-methylstyrenes, 2,4-dimethylstyrene, para-ethyl styrene, etc., aryl substituted halostyrenes such as, e.g., ortho-, meta- and para-chlorostyrenes or bromo-styrenes, 2,4-dichlorostyrenes, 2-methyl-4-chlorostyrene, etc.; mixtures thereof with one another; and mixtures thereof with alphamethylstyrene. When alphamethylstyrene-containing mixtures are employed, the components should be proportioned such that the alphamethylstyrene does not constitute more than about 70% of the total weight of the superstrate-forming monomers. Various of the ethylenically unsaturated monomers hereinabove defined are employed in the example, but may be replaced, with equivalent results, with any of the other monomers characterized above, or mixtures thereof.

*Graft copolymer substrate.*—The substrate of the graft copolymer is a diene rubber polymer which comprises, (a) from about 40 to 100%, and preferably from about 75 to 100%, by weight of a chemically-combined conjugated diene and (b) from zero to about 60%, and preferably zero to about 25%, by weight of other chemically-combined ethylenically unsaturated monomer(s).

Conjugated dienes suitable for use are butadiene, isoprene, and mixtures thereof.

The copolymerizable ethylenically unsaturated monomer(s) suitable for use are selected from a wide class of vinyl and vinylidene monomers as defined above in conjunction with the superstrate monomers. In a preferred embodiment, the substrate will comprise the conjugated diene in chemical combination with, as the copolymerizable monomer, an ethylenically unsaturated alcohol or a monovinylidene aromatic compound, both as heretofore defined. In a particularly preferred embodiment, both an ethylenically unsaturated alcohol and a monovinylidene aromatic compound, and especially styrene, will be employed. In this last embodiment, the diene rubber polymer substrate will comprise (a) from about 40 to 99%, and preferably from about 75 to 99%, by weight of the chemically-combined conjugated diene, (b) from about 1 to 60%, and preferably from about 1 to 25%, by weight of the chemically-combined hydroxylic monomer and (c) from about 1 to 60%, and preferably from about 1 to 25%, by weight of the monovinylidene aromatic compound.

This invention is not limited in the manner of manufacture of the diene rubber polymer. The examples show free radical polymerization in aqueous systems but equally satisfactory results are obtained using, e.g., anionic or cationic catalysts in aqueous or organic systems. In this way, diene rubbers may be made from monomer combinations which do not readily polymerize by, e.g., free radical mechanism. Similarly, monomers which do not copolymerize readily with butadiene or isoprene can be used in conjunction with other copolymerizable monomers capable of copolymerization with both to form, e.g., terpolymers.

Thus, in various embodiments the copolymerizable ethylenically unsaturated monomer(s) may be olefins such as, e.g., ethylene, propylene, isobutylene, 3-methyl butene-1, butene-1, pentene-1, etc., mono- and polycarboxylic acid esters such as, e.g., methyl methacrylate, ethyl acrylate, diethyl maleate, etc.; mono- and polycarboxylic acids or anhydrides such as, e.g., acrylic acid, methacrylic acid, crotonic acid, fumaric acid, maleic acid, maleic anhydride, itaconic acid, etc.; vinyl and vinylidene halides such as e.g., vinyl chloride, vinyl bromide, vinylidene chloride, etc.; monovinylidene aromatic compounds such as styrene; aryl substituted alkyl styrenes such as, e.g., ortho-, meta- and para-methylstyrenes, 2,4-dimethylstyrene, para-ethyl styrene, etc.; aryl substituted halostyrenes such as, e.g., ortho-, meta- and para-chlorostyrenes or bromostyrenes, 2,4-dichlorostyrene, 2-methyl-4-chlorostyrene, etc.; aromatic alcohols such as, e.g., vinyl benzyl alcohol, 2-phenyl allyl alcohol, vinyl betahydroxyethyl benzene, betahydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hydroxymethyl butadiene - 1,3, 2,3 - bis-(hydroxymethyl)butadiene-1,3, etc.; hydroxylic mono- and poly-carboxylic acid esters such as, e.g., ethyl betahydroxyethyl fumarate, bis-(betahydroxyethyl)fumarate, betahydroxyethyl acrylate, butyl betahydroxy-propyl fumarate, betahydroxypropyl methacrylate, betahydroxypropyl crotonate, bis-(betahydroxyethyl)itaconate, ethyl betahydroxyethyl maleate, alphahydroxymethyl methacrylate, etc.; hydroxylic mono- and poly-carboxylic acids such as, e.g., alphahydroxymethyl acrylic acid, alphahydroxymethyl crotonic acid, hydroxymethyl fumaric acid, hydroxypropyl maleic acid, etc.; hydroxylic amino and amido monomers such as, e.g., alphahydroxymethyl acrylamide, N-hydroxymethyl acrylamide, N-hydroxymethyl maleimide, N-betahydroxypropyl maleimide, betahydroxyethyl acrylamide, 2-hydroxymethyl allyl amine, etc.; alphahydroxymethyl acrylonitrile; etc. Various of the ethylenically unsaturated monomers hereinabove defined are employed in the examples, but may be replaced, with equivalent results with any of the other monomers characterized above, or mixtures thereof.

If desired, a chemical cross-linking agent can be used in the preparation of the substrate polymer. Generally, amounts of up to about 5% based on the weight of the rubber-forming monomers is sufficient. Cross-linking agent contents of 0.5–1.25% are particularly advantageous. Any cross-linking agent capable of reacting with the rubber-forming monomers can be used in the practice of the invention. Such cross-linking agents are, of course, already well known and include, e.g., divinylbenzene, diallyl maleate, diallyl fumarate, diallyl adipate, diallyl phthalate, allyl acrylate, allyl methacrylate, diacrylates and dimethacrylates of polyhydric alcohols, e.g., ethylene glycol dimethacrylate, etc.

In preparing the hydroxylated graft copolymers, the diene rubber polymers are usually employed in the form of freshly-prepared latices or latices which have been stored in an inert atmosphere. These latices can be prepared by any of the aqueous emulsion polymerization techniques conventionally utilized for the preparation of such latices. Generally, the monomers are emulsified in water with the aid of about 2–7%, based on the weight of the monomers, of a micelle-forming emulsifying agent and polymerized at 0.80° C. in the presence of a water-soluble free radical polymerization initiator or redox catalyst. The reaction mixture can, and usually does, also contain a chain transfer agent, e.g., a higher alkyl mercaptan such as dodecyl mercaptan.

ACID INTERPOLYMER

The acid interpolymer components of the compositions of the present invention are substantially homogeneous interpolymers of (a) 20–45 and preferably 20–35 mol percent of an acid monomer of the group consisting of an alpha,beta-ethylenically unsaturated polybasic acid, an anhydride of an alpha,beta-ethylenically unsaturated polybasic acid and mixtures thereof, and (b) 80–55 and preferably 80–65 mol percent of at least one vinylidene monomer interpolymerizable with said acid monomer.

Typical examples of the acid monomers that can be employed in the acid interpolymer include maleic acid, maleic anhydride, chloromaleic acid, fumaric acid, citraconic acid, citraconic anhydride, itaconic acid and itaconic anhydrde. Typical examples of the vinylidene monomers which can be employed in the acid interpolymer include mono- and diolefins such as ethylene, propylene, butene-1, isobutylene, butadiene and isoprene; vinyl halides such as vinyl chloride and vinyl bromide; vinylidene halides such as vinylidene chloride; vinylidene aromatic hydrocarbons and halogenated derivatives thereof such as styrene, vinyl naphthalene, ring-alkyl-substituted styrenes, e.g., o-, m-, and p-methylstyrene, 2,4-dimethylstyrene, ring-halogen-substituted styrenes, e.g., o-, m-, and p-chlorostyrene, 2,5-dichlorostyrene, alpha-alkyl-substituted styrenes, e.g., alpha-methylstyrene, alpha-ethylstyrene; acrylic acid and methacrylic acid esters of 1–18 carbon alkanols, e.g., methyl methacrylate, butyl methacrylate, ethyl acrylate, dodecyl acrylate; acrylonitrile; methacrylonitrile; acrylamide; methacrylamide; vinyl alkyl ketones such as vinyl methyl ketone and vinyl butyl ketone; vinyl alkyl ethers such as vinyl methyl ether and vinyl butyl ether; vinyl esters of 1–18 carbon atom carboxylic acids such as vinyl formate, vinyl acetate, vinyl stearate, and vinyl benzoate; etc. The preferred acid interpolymers to be employed in the compositions of the invention are interpolymers of maleic anhydride and a vinylidene aromatic hydrocarbon and especially styrene.

The acid interpolymers employed in the compositions of this invention differ from conventional acid interpolymers in three important respects. First, the acid monomer and the vinylidene monomer are randomly distributed throughout the polymer chains in the mol ratios previously stated, i.e., 20–45 mol percent of the acid monomer and, correspondingly, 80–55 mol percent of the vinylidene monomer, rather than in a 1:1 mol ratio with the two monomer units regularly alternating in the polymer chain, which structure is a characteristic of the corresponding acid interpolymers previously reported in the art. Second, the acid interpolymers are homogeneous and essentially all of the polymer chains have the acid monomer and the vinylidene monomer combined in essentially the mol ratios previously stated. Specifically, the acid interpolymers are essentially free of (a) co-formed interpolymers in which the acid monomer and the vinylidene monomer are combined in a 1:1 mol ratio with the two monomer units regularly alternating in the polymer chain, and (b) co-formed homopolymers of the vinylidene monomer. Third, the acid interpolymers have a molecular weight sufficiently low so that the interpolymers have (1) a softening point (as determined by the well-known Parr-Bar method) of less than about 225° C., preferably of less than 205° C. and more especially in the range of 60–180° C., and (b) an intrinsic viscosity of less than 0.5 and preferably less than 0.4 as determined in pyridine at 30° C. Acid interpolymers having such softening points and intrinsic viscosities have a number average molecular weight of less than about 10,000 and preferably less than about 5,000.

Special polymerization techniques must be employed to prepare acid interpolymers meeting the requirements of the invention. Preferably such homogeneous acid interpolymers are prepared by a solution polymerization technique in which the acid monomer and the vinylidene monomer are charged to the polymerization reaction in the molar ratio desired in the ultimate interpolymer. In addition, the monomers are charged to the polymerization medium at substantially the rate at which they will polymerize so that they will polymerize substantially immediately as they enter the polymerization medium. As a result of these techniques, the formulation of the alternating 1:1 interpolymer is avoided.

To obtain an acid interpolymer having a Parr-Bar softening point and an intrinsic viscosity within the range desired, the polymerization process should be carried out at temperatures above about 80° C. and preferably in the range of 140–170° C. in solvents which function as chain transfer agents. Although a number of solvents can be used for this purpose, it is preferred to employ aromatic hydrocarbons such as xylene, ethylbenzene, diethylbenzene, isopropylbenzene, diisopropylbenzene and the like. It is also desirable to employ relatively large quantities of peroxide polymerization initiators such as benzoyl peroxide and the like, e.g., 0.1–5 and preferably 0.5–2 parts of initiator per 100 parts of monomers. In many cases, it is desirable to use molecular weight regulators preferably from the class of chain transfer agents such as mercaptans, terpenes and the like, e.g., in amounts of up to 10 and preferably 0.5–5 parts per 100 parts of monomers. The polymerization procedure described in the preparation of Acid Interpolymer A in Part A of Example II represents the best mode presently contemplated for preparing the acid interpolymer component of the compositions of the invention.

EPOXY COMPOUNDS

The epoxy compound included in the compositions of the invention may be any epoxy compound containing two or more epoxy groups. The preferred epoxy compounds to be employed in the invention contain two or more epoxy groups of the structure:

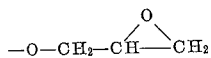

Typical examples of such preferred epoxy compound include polyglycidyl esters of polybasic acids as disclosed in U.S. 2,866,767; polyglycidyl ethers of polyhydric phenols as disclosed in U.S. 2,467,171, U.S. 2,506,486, U.S. 2,640,037 and U.S. 2,841,595; and polyglycidyl ethers of polyhydric alcohols as disclosed in U.S. 2,538,072, U.S. 2,581,464, U.S. 2,730,427 and U.S. 2,759,269. Especially preferred epoxy compounds are the polyglycidyl ethers of dihydric phenols which have structures which may be represented by the formula:

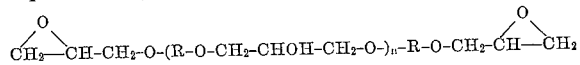

wherein $n$ is an integer of the series 0, 1, 2, 3 . . . , and R represents the divalent hydrocarbon radical of the dihydric phenol.

Other epoxy compounds which can be used in the composition of the invention include; epoxidized drying oils such as epoxidized linseed oil, epoxidized soybean oil and other epoxidized drying oils as disclosed in U.S. 2,569,502; epoxidized polyolefins such as vinyl cyclohexene dioxide, dicyclopentadiene oxide, and divinyl benzene dioxide; epoxidized polyunsaturated monoesters; epoxidized poly-unsaturated polyesters as disclosed in published Australian patent application 11,826/55, glycol bis-exodihydrocyclopentadienyl ethers as disclosed in U.S. 2,543,419; epoxidized novolac resins; and epoxidized liquid diene polymers such as epoxidized liquid polybutadiene as disclosed in U.S. 2,946,756. Still other epoxy compounds which can be employed are those disclosed in U.S. 2,992,193, U.S. 2,971,942, U.S. 2,949,438, U.S. 2,938,875, U.S. 2,936,292, U.S 2,918,439, US 2,917,46, and Belgium 588,068.

The acid interpolymers and the epoxy compounds are included in the compositions of this invention in ratios such as to provide an average of 0.2–1.2 and preferably 0.4–1.0 epoxy group per carboxyl group of the acid interpolymer. For the purpose of calculating of these ratios, an anyhydride group is considered to be the equivalent of two carboxyl groups.

It is usually desirable to employ small quantities of a catalyst to accelerate the reaction between the acid interpolymer and the epoxy compound. Although diverse types of catalysts can be used for this purpose, it is preferred to employ quarternary ammonium compounds such as lauryl trimethyl ammonium chloride. Other amines such as lutidine, collidine, pyridine, benzylamine, benzyldimethylamine, 1,8-diamino-p-menthane, and N-substituted derivatives thereof obtained by alkylation, such as N,N,N',N' - tetramethyl - 1,8 - diamino - p - menthane, and N,N'-dimethyl - 1,8 - diamino - p - methane, or a polyalkylenepolyamine, including ethylenediamine, diethylenetrimine, triethylenetetramine, etc. also can be employed as catalysts in the compositions of the invention. Tin compounds such as stannous octoate and dibutyl tin di-2-ethylhexoate also can be employed. When the epoxy groups of the epoxy compounds are ring epoxy groups, e.g., as in dicyclopentadienedioxide, it is sometimes desirable to employ Lewis acids as the catalyst, e.g., $BF_3$ or p-toluene sulfonic acid. Where catalysts are employed, they will ordinarily be employed in the range of about 0.1–5.0 and preferably 0.5–2.0% based upon the weight of the acid interpolymer.

It has been observed that the cure characteristics of the resin compositions of the invention can be modified by incorporating therein a phenol, a carboxylic acid and/or an anhydride of a polycarboxylic acid. Such cure modifiers function to increase the gelation time and provide a harder final cure, i.e., raise the heat distortion temperature. Typical modifiers include phenol, resorcinol, novolac resins, salicylic acid, resorcyclic acid, benzoic acid, adipic acid, phthalic anhydride, maleic anhydride and pyromellitic dianhydride. The phenolic type modifiers are customarily employed in the range of 0.1–5.0 and preferably 0.5–2.0 parts per 100 parts of the acid interpolymer. The carboxylic acid and carboxylic acid anhydride modifiers are customarily employed in the amount of 0.5–10 and preferably 2.0–5.0 parts per 100 parts of the acid interpolymer.

UTILITY

The compositions of the present invention find their primary utility in the formulation and manufacture of impregnating compositions for the manufacture of laminated articles, adhesives, molding compositions, and coating compositions.

The impregnating and coating compositions of the present invention comprise an organic solvent solution of the hydroxylated graft copolymer, the acid interpolymer and the epoxy compound in the ratios previously described. The organic solvent included in the compositions may be any of the common solvents which will dissolve or disperse all components. Typical examples of such solvents include the aromatic hydrocarbons, halogenated aromatic hydrocarbons, alcohols, ethers, ketones, esters or any mixture thereof such as xylene-butanol mixtures, ketone-ester mixtures, etc.

Laminated articles can be prepared by impregnating a web with a mixture of the hydroxylated graft copolymer, the acid interpolymer and the epoxy compound and curing the impregnated web at an elevated temperature, preferably while maintaining the web under pressure. The web employed may be paper or a woven textile, but preferably is a web of high melting fibers such as glass fibers, metal filaments, asbestos filaments, nylon filaments and filaments of other high melting polymers.

In preparing such laminates, the reinforcing web is usually impregnated with a solution of the several resinous components and heated at temperatures up to about 200° F. to reduce the volatiles content of the impregnated web. As the compositions of the invention do not cure at these temperatures, it is possible to reduce the volatiles content to very low levels, e.g., less than 2%. In most cases, it is desirable to impregnate the web so that it will contain about 30–50 and more especially about 35–45% of resin solids. Thereafter, one or a plurality of plies of the resin impregnated web are layed up and pressed, e.g., at a pressure of 50–1000 p.s.i., for about 15–60 minutes at an elevated temperature, e.g., 250–400° F. to bond the plies and cure the resin. As no volatile materials are formed in the curing of the resin system, it is possible to prepare high density laminates of great strength.

The compositions of the invention also can be used as adhesives to bond together diverse surfaces such as wood, paper, textiles, metals and the like. In bonding such surfaces together, the surfaces are coated with a mixture of the hydroxylated graft copolymer, the acid interpolymer and the epoxy compound and subjected to heat and pressure. The adhesive composition at the glue line may be heated conveniently by dielectric methods.

Molding compositions can be prepared by intimately blending the hydroxylated graft copolymer, the acid interpolymer and the epoxy compound with a finely-divided filler such as glass, asbestos, paper, wood flour and the like. The resulting molding compositions can be either compression or injection molded and cured by heating to temperatures above about 300° F.

The coating compositions of the invention are identical with the impregnating compositions previously described except that in addition to the organic solvent, the hydroxylated graft copolymer, the acid interpolymer and the epoxy compound, the coating compositions also may contain pigments, extenders, fillers, delustrants, and the like. Any pigments which are not sensitive to the acid interpolymer may be employed including such pigments as titanium dioxide, copper phthalocyanine, ultramarine blue, zinc oxide, zinc sulfide, barium sulfate, calcium carbonate, zinc chromate, carbon black and the like.

Films may be layed down from the coating compositions of the invention by any conventional technique such as spraying, brushing, roll coating, dipping, etc. The wet films can be cured by heating to elevated temperatures of the order of 300 or preferably 350° F. or higher for short periods of time of the order of 10–60 minutes depending upon the curing temperature. The coating compositions of the invention have particular utility in coating metal surfaces such as primed or unprimed steels, aluminum, chromium, nickel, brass, copper, etc. The compositions also may be used to coat other surfaces such as paper, cardboard, leather, textile fabrics, glass, porcelain and other vitreous materials, and to plastics such as polyesters, methacrylate polymers, styrene polymers and the like.

The cured films prepared from the coating compositions of the invention are characterized by having (a) good adhesion to either primed or unprimed metal substrates, (b) high hardness values, (c) good gloss, (d) good color, (e) excellent solvent and stain resistance, and (f) good detergent resistance.

The compositions of the invention also have other miscellaneous uses in the industrial arts. For example, the compositions may be used as a binder in the manufacture of dense high quality grinding wheels. Attractive glossy overlays on plywood and other wooden surfaces can be obtained by coating the surface with these compositions and then curing the coatings while maintaining the assembly under pressure. The compositions also may be employed as the resin binder of the resin impregnated paper of air filters employed for automotive engines. They also can be used in lieu of phenol-formaldehyde resins as the binder for sand moldings in foundry practice. In addition, they may be used as the resin binder in the growing important field of filament wound reinforced plastics.

The above descriptions and particularly the examples are set forth for purposes of illustration only. Many variations and modifications thereof will be obvious to those skilled in the art and can be made without departing from the spirit and scope of the invention herein described.

What is claimed is:

1. A blend comprising
   (A) from about 1 to 250 parts by weight of a graft copolymer comprising a diene rubber substrate polymer and a hydroxylic superstrate polymer in proportion of from about 15 to 200 parts by weight of superstrate polymer per 100 parts by weight of substrate polymer; said substrate polymer being a rubbery polymer of from about 40 to 100% by weight of a conjugated diene selected from the group consisting of butadiene, isoprene, and mixtures thereof, and correspondingly, from about 60 to zero percent by weight of at least one vinylidene monomer copolymerizable with said conjugated diene; said superstrate polymer being a polymer of (1) from about 1 to 100% by weight of an ethylenically unsaturated alcohol, (2) from zero to about 50% by weight of an ethylenically unsaturated nitrile, and (3) from zero to about 95% by weight of at least one vinylidene monomer interpolymerizable therewith;
   (B) 100 parts by weight of a substantially homogeneous interpolymer of (1) from about 20 to 45 mol percent of an acid monomer selected from the group consisting of alpha,beta-ethylenically unsaturated polybasic acids, anhydrides of alpha,beta-ethylenically unsaturated polybasic acids, and mixtures thereof, and, correspondingly, (2) from about 80 to 55 mol percent of at least one vinylidene monomer interpolymerizable with said acid monomer; said interpolymer having a Parr-Bar softening point of less than about 225° C. and an intrinsic viscosity of less than about 0.5 as determined in pyridine at 30° C.; and
   (C) an epoxy compound containing a plurality of epoxy groups in proportion so as to provide an average of from about 0.2 to 1.2 epoxy groups per carboxyl group of said component (B).

2. A blend as in claim 1 wherein component (B) is an interpolymer of styrene and maleic anhydride.

3. A blend as in claim 1 wherein component (B) is an interpolymer of styrene and maleic anhydride and component (C) contains a plurality of epoxy groups of the structure:

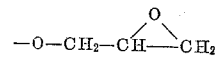

4. A blend as in claim 2 wherein the substrate of component (A) is an interpolymer of butadiene and styrene.

5. A blend as in claim 4 wherein the superstrate of component (A) is an interpolymer of styrene, acrylonitrile and vinyl benzyl alcohol.

6. A blend as in claim 4 wherein the superstrate of component (A) is an interpolymer of styrene, acrylonitrile and phenyl allyl alcohol.

7. A blend as in claim 2 wherein the substrate of component (A) is an interpolymer of butadiene, styrene and vinyl benzyl alcohol.

8. A blend as in claim 7 wherein the superstrate of component (A) is an interpolymer of styrene, acrylonitrile, and vinyl benzyl alcohol.

9. A blend as in claim 2 wherein the substrate of component (A) is an interpolymer of butadiene, styrene and phenyl allyl alcohol.

10. A blend as in claim 9 wherein the superstrate of component (A) is an interpolymer of styrene, acrylonitrile and phenyl allyl alcohol.

11. A coating and impregnating composition comprising in an organic liquid media
    (A) from about 1 to 250 parts by weight of a graft copolymer comprising a diene rubber substrate polymer and a hydroxylic superstrate polymer in proportion of from about 15 to 200 parts by weight of superstrate polymer per 100 parts by weight of substrate polymer; said substrate polymer being a rubbery polymer of from about 40 to 100% by weight of a conjugated diene selected from the group consisting of butadiene, isoprene, and mixtures thereof, and correspondingly, from about 60 to zero percent by weight of at least one vinylidene monomer copolymerizable with said conjugated diene; said superstrate polymer being a polymer of (1) from about 1 to 100% by weight of an ethylenically unsaturated alcohol, (2) from zero to about 50% by weight of an ethylenically unsaturated nitrile, and (3) from zero to about 95% by weight of at least one vinylidene monomer interpolymerizable therewith;
    (B) 100 parts by weight of a substantially homogeneous interpolymer of (1) from about 20 to 45 mol percent of an acid monomer selected from the group consisting of alpha,beta-ethylenically unsaturated polybasic acids, anhydrides of alpha,beta-ethylenically unsaturated polybasic acids, and mixtures thereof, and, correspondingly, (2) from about 80 to 55 mol percent of at least one vinylidene monomer interpolymerizable with said acid monomer; said interpolymer having a Parr-Bar softening point of less than about 225° C. and an intrinsic viscosity of less than about 0.5 as determined in pyridine at 30° C., and
    (C) an epoxy compound containing a plurality of epoxy groups in proportion so as to provide an average of from about 0.2 to 1.2 epoxy groups per carboxyl group of said component (B).

12. A coating and impregnating composition as in claim 11 wherein component (B) is an interpolymer of styrene and maleic anhydride.

13. A laminate comprising a reinforcing web impregnated and bonded with a thermoset resin mixture consisting essentially of (A) from about 1 to 250 parts by weight of a graft copolymer comprising a diene rubber substrate polymer and a hydroxylic superstrate polymer in proportion of from about 15 to 200 parts by weight of superstrate polymer per 100 parts by weight of substrate polymer; said substrate polymer being a rubbery polymer of from about 40 to 100% by weight of a conjugated diene selected from the group consisting of butadiene, isoprene, and mixtures thereof, and correspondingly, from about 60 to zero percent by weight of at least one vinylidene monomer copolymerizable with said conjugated diene; said superstrate polymer being a polymer of (1) from about 1 to 100% by weight of an ethylenically unsaturated alcohol, (2) from zero to about 50% by weight of an ethylenically unsaturated nitrile, and (3) from zero to about 95% by weight of at least one vinylidene monomer interpolymerizable therewith;

(B) 100 parts by weight of a substantially homogeneous interpolymer of (1) from about 20 to 45 mol percent of an acid monomer selected from the group consisting of alpha,beta-ethylenically unsaturated polybasic acids, anhydrides of alpha,beta-ethylenically unsaturated polybasic acids, and mixtures thereof, and correspondingly, (2) from about 80 to 55 mol percent of at least one vinylidene monomer interpolymerizable with said acid monomer; said interpolymer having a Parr-Bar softening point of less than about 225° C. and an intrinsic viscosity of less than about 0.5 as determined in pyridine at 30° C.; and (C) an epoxy compound containing a plurality of epoxy groups in proportion so as to provide an average of from about 0.2 to 1.2 epoxy groups per carboxyl group of said component (B).

14. A laminate as in claim 13 wherein component (B) is an interpolymer of styrene and maleic anhydride.

No references cited.

MURRAY TILLMAN, *Primary Examiner.*

P. LIEBERMAN, *Assistant Examiner.*